(No Model.)

W. H. MAXWELL.
Manufacture of Glass Insulated Telegraph Wires.

No. 243,282. Patented June 21, 1881.

Witnesses
R. C. Winshall
M. Swartzwelder

Inventor
William H. Maxwell,
by his attorneys
Bakewell & Kerr

UNITED STATES PATENT OFFICE.

WILLIAM H. MAXWELL, OF PHILLIPSBURG, ASSIGNOR OF TWO-THIRDS TO
A. S. TOMPKINSON, OF PHILADELPHIA, PENNSYLVANIA.

MANUFACTURE OF GLASS-INSULATED TELEGRAPH-WIRES.

SPECIFICATION forming part of Letters Patent No. 243,282, dated June 21, 1881.

Application filed March 12, 1881. (No model.)

*To all whom it may concern:*

Be it known that I, WILLIAM H. MAXWELL, of Phillipsburg, in the county of Beaver and State of Pennsylvania, have invented a new and useful Improvement in Manufacture of Glass-Insulated Telegraph-Wires; and I do hereby declare the following to be a full, clear, and exact description thereof.

In the manufacture of glass-insulated wire for underground telegraph purposes it is desirable to put the glass upon the wire or wires in such a way that it shall not be fractured or broken and expose the wire or wires to the access of water or moisture that may penetrate the outer box or casing. Incased wire has been produced by surrounding it with a glass tube and the glass tube by an iron one, and then heating the whole and drawing it out to the required length; also, by placing the wires between plates of glass and heating and uniting them by pressure. The article thus produced has not as yet been put into general use, principally for the reason of the great expense attending its manufacture, with the additional reason as against the first form described that the glass is generally fractured or "crizzled" by the treatment it receives, and is liable to admit moisture to the wires in case any penetrates or enters the outer metallic casing, and thereby destroy the insulation. It has also been proposed to draw the wires through molten glass and so coat them.

My invention consists of an improved method of producing the said wire or wire cable, whereby the glass is preserved in a proper condition, and which is sufficiently cheap and simple to enable it to be made cheap enough for common use.

To enable others skilled in the art to make and use my invention, I will describe it with reference to the accompanying drawings, in which—

Figure 1:
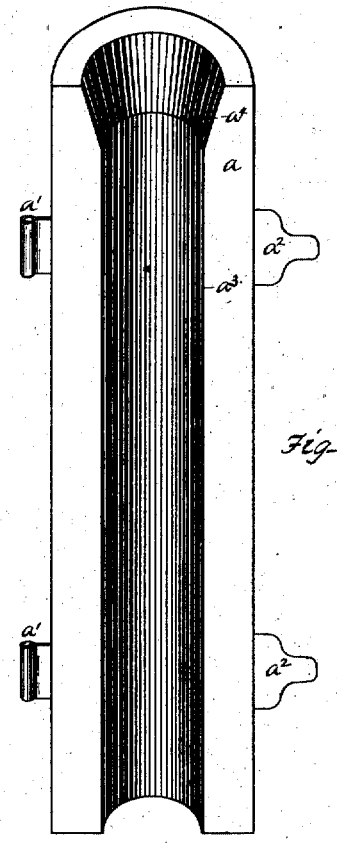
Figure 2:
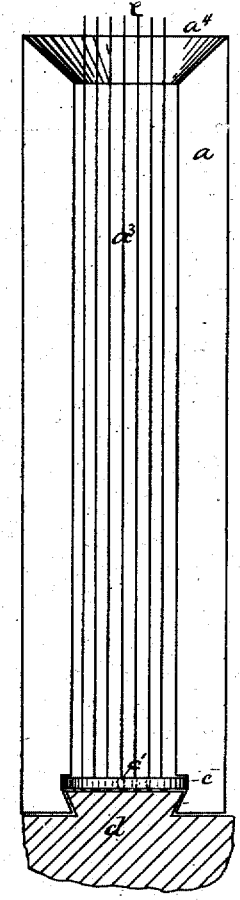
Figure 3:
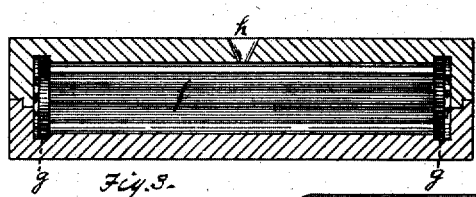
Figure 5:
Figure 4:

Figure 1 is a perspective view of one-half of a mold for practicing my invention. Fig. 2 is a section of the same. Fig. 3 is another form of mold. Fig. 4 is a view of a glass-incased wire cable, and Fig. 5 is a view of a glass and metal incased cable.

Like letters of reference indicate like parts in each.

The mold $a$ (shown by Figs. 1 and 2) is a vertical mold, formed of two parts, hinged at $a'$ and fastened at $a^2$, having a cylindrical cavity, $a^3$, and flaring mouth $a^4$. It is provided with a dovetail groove, $b$, which closes around the corresponding-shaped bottom $d$, but is sufficiently deep to permit the placing of a disk, $c$, between the bottom and the shoulders of the groove. The disk $c$ is perforated, and is designed for the attachment of the wires $e$, which are coiled on a suitable reel or drum above the mold, and are drawn down and attached to the disk by passing them through the holes $c'$ and giving the ends a twist. The disk is placed on the bottom $d$, the mold closed around it, and by turning the reel the wires drawn straight, and then they are ready for the application of the glass. The latter is melted, and when in a sufficiently fluid condition is run or cast into the mold directly from a suitable cupola, pot, or melting-furnace, or by the use of a ladle.

The mold may, if desired, be rotated or oscillated on its vertical axis, to prevent sticking or mold-marks, or the sides may be coated with a suitable coating, such as is used in glass-molds, or may be lined with strips of sheet-iron, asbestus-cloth, or other suitable material. This method is not applicable to the use of wires made of copper or other easily-fused metal or metallic alloy. When such wire is used I place glass tubes $f$ on the wires and then cast the molten glass upon them, as described.

Where it is designed to produce metal-incased glass-insulated wire the glass tubes $f$ are also used, the metal, whether iron or other metal, being poured in as described with relation to the glass. When metal is used the mold should be water-cooled. I prefer for this purpose a solid mold with regular cavity.

Instead of having both disk $c$ and bottom $d$, the disk may constitute the only bottom. In such case, if the mold is solid, the wires would have to be drawn through the mold before being attached to the disk. This is not necessary if the mold is partible.

Fig. 3 shows a horizontal mold for casting the casing. In this case the ends of the wires are secured to a perforated plate, $g$, placed in each end of the mold. The glass or metal is poured in through a suitable gate, $h$. Any other suitable way of securing, placing, or stretching the wires in the mold may be used. The purpose is to have them straight. Thus the glass may be cast in and around the wires and form a perfect union therewith. When the glass tubes are used they are not fractured by the casting operation, but are softened externally, and, fusing, unite with the cast metal or glass. The method is cheap, simple, and easy. After being removed from the mold the article should be properly annealed.

What I claim as my invention, and desire to secure by Letters Patent, is—

1. The method of forming glass-incased wire or wires, consisting of stretching them in a mold and casting the molten glass around them, substantially as and for the purposes described.

2. The method of forming glass-insulated telegraph wire or wires, consisting of placing glass tubes on the wires, stretching them in a mold, and casting glass or metal in and around the glass tubes, substantially as described.

In testimony whereof I have hereunto set my hand.

WILLIAM H. MAXWELL.

Witnesses:
T. B. KERR,
J. K. SMITH.

It is hereby certified that in Letters Patent No. 243,282, granted June 21, 1881, upon the application of William H. Maxwell, for an improvement in the "Manufacture of Glass-Insulated Telegraph-Wires," the name of the assignee of two-thirds interest was erroneously written and printed therein "A. S. Tompkinson;" that the correct name is "A. S. Tomkinson;" that the proper corrections have been made in the files and records pertaining to the case in the Patent Office, and are hereby made in said Letters Patent.

Signed, countersigned, and sealed this 28th day of June, A. D. 1881.

[SEAL.]

A. BELL,
*Acting Secretary of the Interior.*

Countersigned:
   E. M. MARBLE,
      *Commissioner of Patents.*